Patented Jan. 19, 1932

1,841,440

UNITED STATES PATENT OFFICE

WINFRID HENTRICH, OF WIESDORF-ON-THE-RHINE, AND JOSEF HILGER, OF COLOGNE-MULHEIM, GERMANY, ASSIGNORS TO GENERAL ANILINE WORKS, INC., OF NEW YORK, N. Y., A CORPORATION OF DELAWARE

PROCESS OF PREPARING 2:4-DI-NITROPHENYL-6-HYDROXYTRIAZINE-1:3:5

No Drawing. Application filed September 23, 1929, Serial No. 394,728, and in Germany October 31, 1928.

The present invention relates to the manufacture of 2:4-di-(nitrophenyl)-6-hydroxytriazine-1:3:5.

The 2:4-di-(4-nitrophenyl)-6-hydroxytriazine-1:3:5

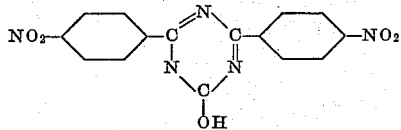

has been described by Rappeport (Ber. der deutschen Chemischen Gesellschaft, vol. 34, page 1989), and the 2:4-di-(3'-nitrophenyl-)-6-hydroxytriazine-1:3:5 by Pinner (Ber. der deutschen Chemischen Gesellschaft, vol. 28, page 482). Both authors obtained these compounds by the action of phosgene on the respective nitrobenzamidines. However, this process gives only a very inferior yield since a large quantity of amidine urea

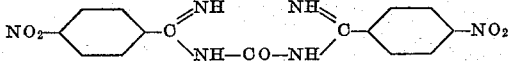

is produced, which in contradistinction to the non-nitrated product cannot be converted to the triazine by heating. Furthermore the method pursued by Pinner with excellent yield in the case of benzamidine (Pinner, The Imido Aether, Berlin 1892, page 263) to proceed via the urethane of the formula

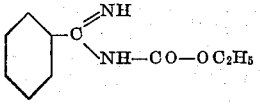

to the triazine cannot be adopted in the case of the nitro benzamidines on account of the difficult solubility of the free nitro-benzamidine bases.

In accordance with the present invention the readily accessible 2:4-diphenyl-6-hydroxytriazine-1:3:5 (Pinner, Die Imidoäther, pages 263, 265) can be converted into the 2:4-di-(nitrophenyl)-6-hydroxytriazine-1:3:5 with good yield by treating same for a prolonged time, say several hours with a nitrating agent, for example with nitrating acid or with nitric acid in sulfuric acid solution, favorably at low temperatures, say between about $-10°$ and $+30°$ C. The compound thus obtained however, possesses a higher melting point than stated by Pinner. Probably Pinner's product was still contaminated with the amidine urea and Pinner did not succeed in obtaining the pure triazine on account of its difficult solubility.

The 2:4-di-(nitrophenyl)-6-hydroxytriazine-1:3:5 is intended to find application as an intermediate product in the manufacture of dyestuffs and pharmaceutical products.

The invention is illustrated by the following examples, but is not restricted thereto:—

*Example 1:*—249 parts by weight of 2:4-diphenyl-6-hydroxytriazine-1:3:5, (melting point 283° C.) are suspended in 3000 parts by weight of monohydrate; the calculated quantity of 25% nitrating acid is slowly dropped in with stirring at 10° C. After standing for 12 hours at room temperature the nitrating mass is poured on to ice, whereby the 2:4-di-(nitrophenyl)-6-hydroxytriazine-1:3:5 precipitates. It is filtered by suction, thoroughly washed with water and the filter residue dissolved in hot dioxane. After careful addition of water until turbidity commences the 2:4-di-(nitrophenyl)-6-hydroxytriazine-1:3:5 separates on cooling in small clusters of fine needles. The compound is insoluble in alcohol, ether and benzene, difficultly soluble in hot pyridine and readily soluble in hot dioxane. Its melting point is not sharp at 280–281° C. The yield amounts to 75% of theory.

Analysis: Calculated for $C_{15}H_9O_5N_5$: C 53.1, H 2.65, N 20.65

Found: 53.15, 2.85, 20.77

*Example 2:*—24.9 parts by weight of 2:4-diphenyl-6-hydroxytriazine-1:3:5 are dissolved in 500 parts by weight of hot acetic acid. The solution is cooled with brisk stirring to 15–20° C. whereby part of the triazine precipitates and at this temperature 16.5 parts by weight of nitric acid of specific gravity 1.450 are slowly dropped in. After stirring for 12 hours the liquid is diluted with four times its volume of water and filtered by suction. The 2:4-di-(nitrophenyl)-6- hydroxytriazine-1:3:5 is obtained from hot dioxane in the form of small needles, melting at 280° C.; the yield is about 70% of the theoretical.

We claim:—

1. The process which comprises treating 2:4-diphenyl-6-hydroxytriazine-1:3:5 with a nitrating agent.

2. The process which comprises treating 2:4-diphenyl-6-hydroxytriazine-1:3:5 with a nitrating agent at a temperature between about −10° and +30° C. for a prolonged time.

3. The process which comprises slowly introducing a calculated amount of nitrating acid into a suspension of 2:4-diphenyl-6-hydroxytriazine-1:3:5 in sulfuric acid monohydrate at about +10° C. and allowing the reaction mass to stand several hours at room temperature.

In testimony whereof we affix our signatures.

WINFRID HENTRICH. [L. S.]
JOSEF HILGER. [L. S.]